UNITED STATES PATENT OFFICE.

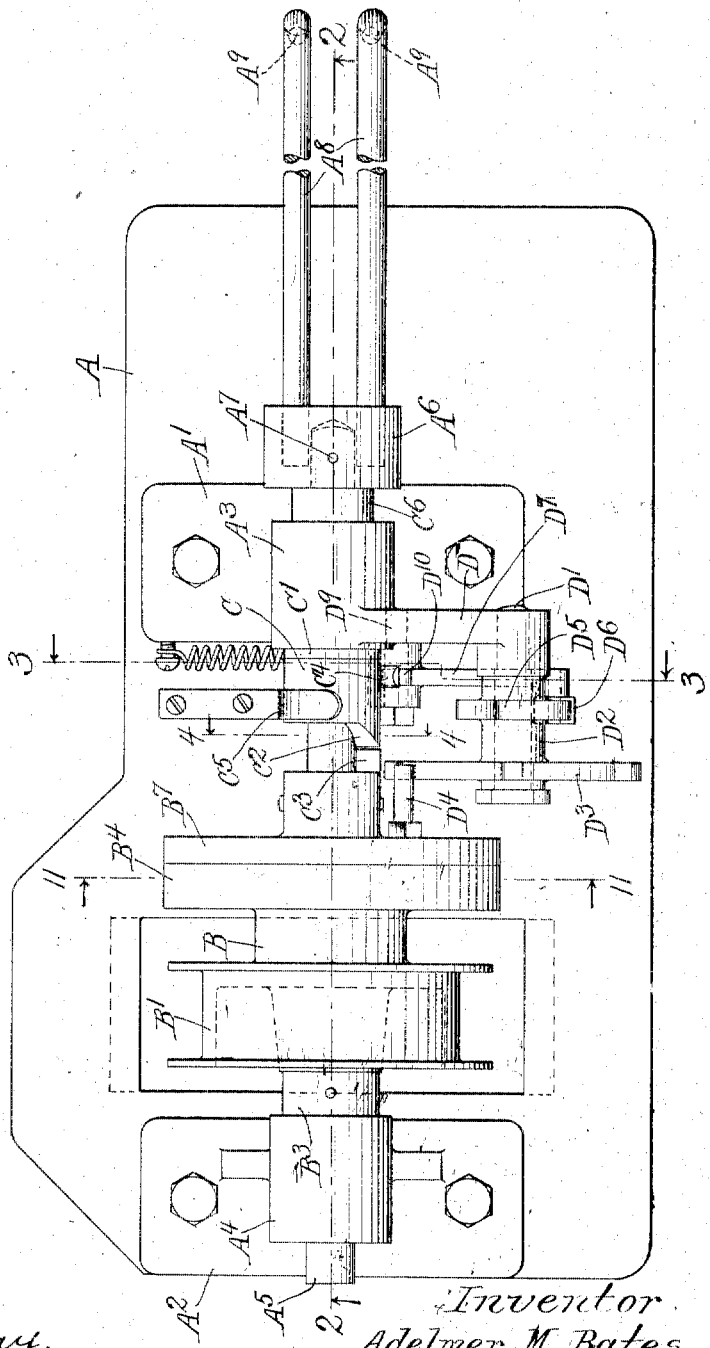

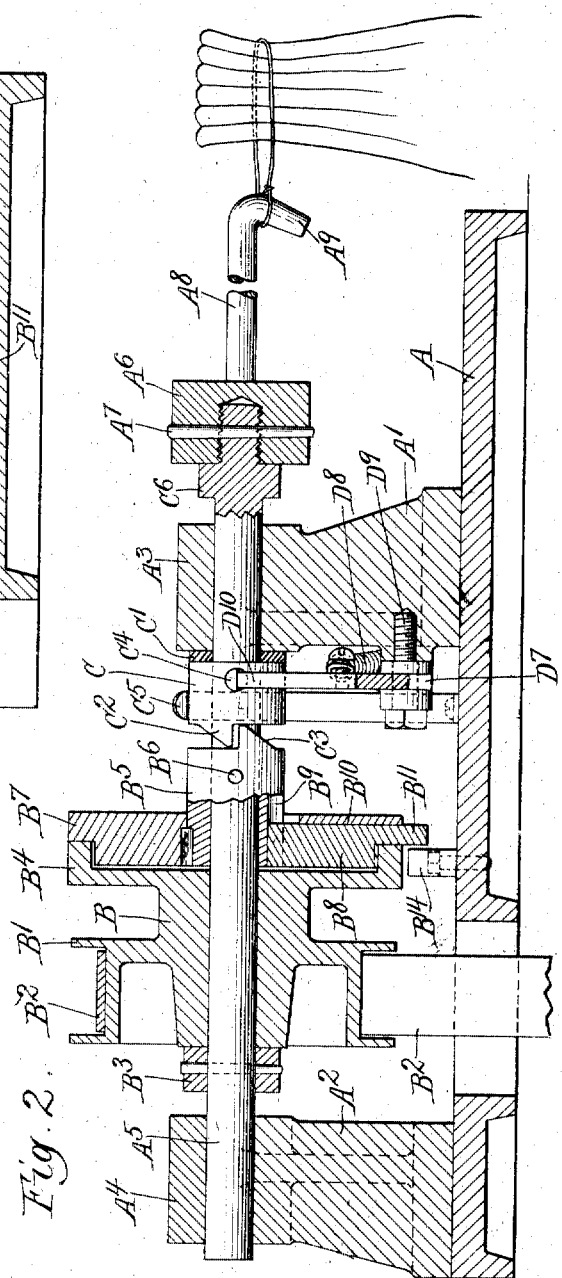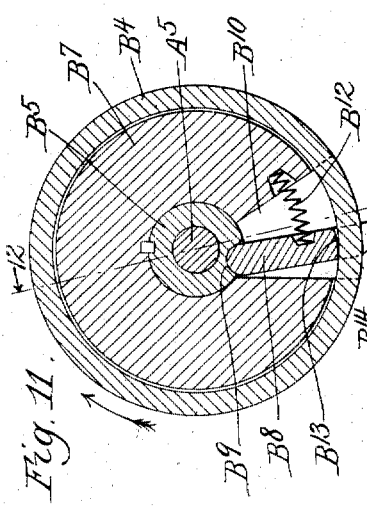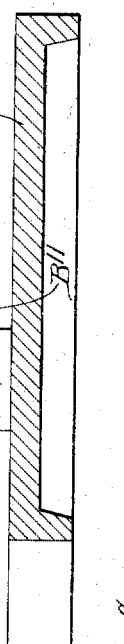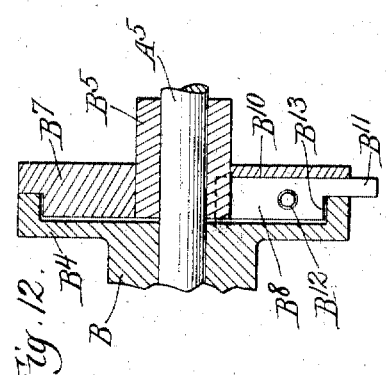

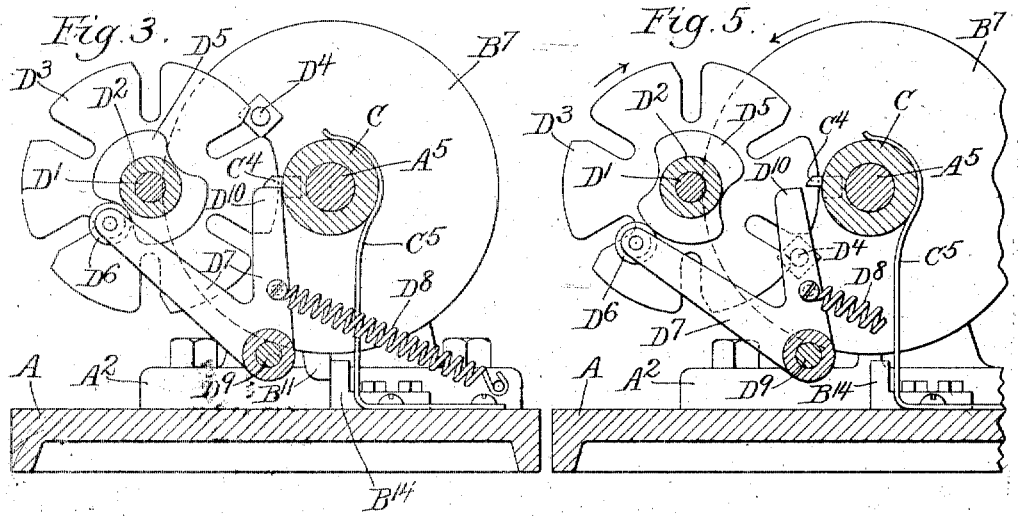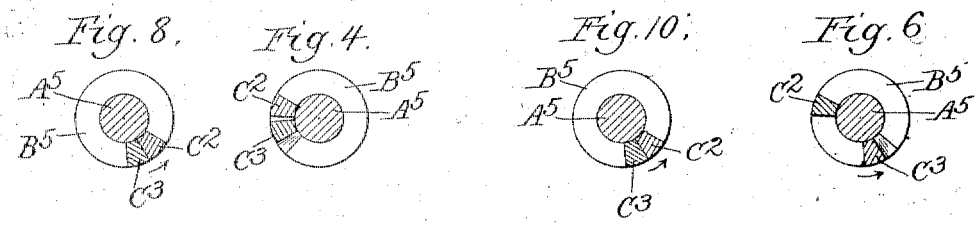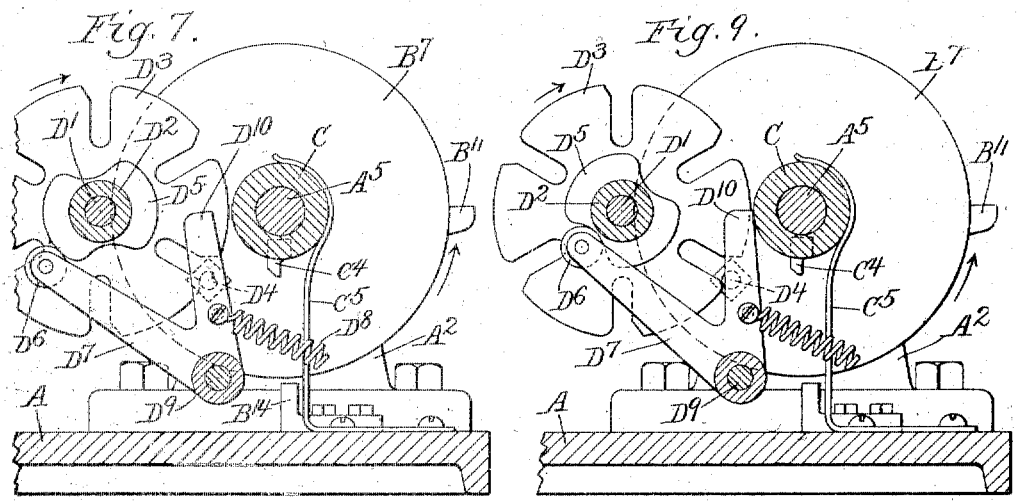

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

BAG-TYING MACHINE.

1,281,121.   Specification of Letters Patent.   Patented Oct. 8, 1918.

Application filed March 2, 1916. Serial No. 81,630.

*To all whom it may concern:*

Be it known that I, ADELMER M. BATES, a citizen of the United States, residing at Chicago, in the county of Cook and State of Illinois, have invented a certain new and useful Improvement in Bag-Tying Machines, of which the following is a specification.

My invention relates to improvements in bag tying machines. It has for one of its objects to provide means for tying or twisting a wire tie about the neck of an open mouthed bag.

The invention is illustrated more or less diagrammatically in the accompanying drawings, wherein Figure 1 is a plan view showing the parts in the first working position;

Fig. 2 is a section along the line 2—2 of Fig. 1 with parts in side elevation after the clutch has been moved into operative position;

Fig. 3 is a section along the line 3—3 of Fig. 1;

Fig. 4 is a section along the line 4—4 of Fig. 1, showing the parts in the same position as in Fig. 3;

Fig. 5 is a section along the line 3—3 of Fig. 1 with the clutch moved 90° beyond the position shown in Fig. 3;

Fig. 6 is a section along the line 4—4 of Fig. 1 showing the parts in the same position as shown in Fig. 5;

Fig. 7 is a section along the line 3—3 of Fig. 1 after the clutch has traveled through one complete revolution from the position shown in Fig. 5;

Fig. 8 is a section along the line 4—4 of Fig. 1 showing the parts in the same position as Fig. 7;

Fig. 9 is a section along the line 3—3 of Fig. 1 after the clutch had made one revolution beyond the position shown in Fig. 7;

Fig. 10 is a section along the line 4—4 of Fig. 1 showing the parts in the same position as in Fig. 9;

Fig. 11 is a section along the line 11—11 of Fig. 1;

Fig. 12 is a section along the line 12—12 of Fig. 11.

Like parts are indicated by like letters throughout the several figures.

A is a rigid machine base. $A^1$ $A^2$ are bearing brackets projecting upwardly therefrom carrying bearings $A^3$ $A^4$ in which the shaft $A^5$ is rotatably and slidably mounted. $A^6$ is a twisting head rigidly attached to the end shaft and held against revolution thereabout by the pin $A^7$. This twisting head carries a pair of parallel twisting rods $A^8$, having hooked ends $A^9$.

B is a hub rotatably mounted on the shaft $A^5$. It is provided with a pulley $B^1$ adapted to be driven by a belt $B^2$ by any suitable power not here shown. The collar $B^3$ engages one end of the hub and limits its movement with respect to the shaft in a left hand direction. $B^4$ is a clutch ring integral with the hub B. The hub $B^5$ is pinned to the shaft $A^5$ by the pin $B^6$ and carries a clutch disk $B^7$ partially within the clutch ring $B^4$. The clutch lever $B^8$ is rotatably mounted in a groove $B^9$ in the hub $B^5$, and extends outwardly within a slot $B^{10}$ in the inner surface of the disk $B^7$. The dog $B^{11}$ extends outwardly from the clutch lever $B^8$ beyond the periphery of the ring and disk to provide means for manipulating the clutch. The spring $B^{12}$ tends to yieldingly force the clutch in a clockwise direction as shown in Fig. 11, so that the clutch shoulder $B^{13}$ tends normally to engage the inner periphery of the clutch ring $B^4$, and as the clutch ring is driven in the direction of the arrow, tends to clamp the ring and disk together to drive the disk and shaft in response to the rotation of the ring. $B^{14}$ is a stop on the base A, projecting upwardly toward the clutch ring $B^4$, and adapted when the parts are in position shown in Fig. 1, to project into the path of the dog $B^{11}$.

C is a stop or throw-out collar floating on the shaft $A^5$. A fiber washer $C^1$ is a stop for the throw-out collar. The throw-out collar carries a wedge or cam member $C^2$ in opposition to a cam member $C^3$ on the hub $B^5$. It also carries a stop member $C^4$. The spring $C^5$ anchored on the base A tends yieldingly to resist rotation or longitudinal movement of the collar C. $C^6$ is a limiting collar on the shaft $A^5$ on the opposed side of the bearing $A^3$, designed to limit the longitudinal movement of the shaft toward the left. The compression of the parts toward the right toward the fiber washer $C^1$ limits the movement of the shaft in that direction so that the shaft is free to move longitudinally through fixed predetermined limits.

D is a bracket extending outwardly from the bearing bracket $A^1$. It carries a bearing pin $D^1$ projecting rearwardly toward the clutch. Rotatably mounted on this pin is a hub $D^2$ having a star wheel $D^3$ thereon. A pin $D^4$ in the face of the clutch disk $B^7$ projects into the path of the star wheel and is adapted to engage and intermittently rotate that wheel. $D^5$ is a cam on the hub $D^2$. $D^6$ is a cam roller carried by a bell crank. Lever $D^7$ is held yieldingly in engagement with the cam at all times by a spring $D^8$ which tends to rotate the lever about its pivot position on the rod $D^9$; and to draw the stop or trigger end $D^{10}$ of the lever, against the surface of the hub C.

It will be evident that, while I have shown in my drawings an operative device, still many changes might be made in size, shape and arrangement of parts without departing materially from the spirit of my invention. I wish therefore, that my drawings be regarded as in a sense diagrammatic.

The use and operation of my invention are as follows:—

The operator with the parts in the position shown in Fig. 1, inserts the open end of a bag into the space between the spring fingers, drops the tie in position at the ends of the fingers and then withdraws the bag against the tie puckering the bag and forcing it into the U-shaped loop thus formed in the tie. He continues to pull on this loop and draws the parts into the position shown in Fig. 2, thus disengaging the dog on the clutch lever from the stop. The spring rocks the clutch lever into the driving position, and the shaft driven by the belt rotates, twisting the spring forks and winding or twisting the tie up on the neck of the bag.

I will now refer to the mechanism illustrated in Figs. 3 to 10 which has as its object to stop the rotation when the necessary number of twists has been made. Preferably three complete turns are enough for the tie. Figs. 3 and 4 show the parts in the position shown in Fig. 1. As soon as the operator starts the machine, the rotation of the clutch pin carries the parts into the position shown in Fig. 5. This rotates the cam through one quarter of a revolution and pulls the stop lever out of engagement with the stop on the floating sleeve. The driving tooth on the clutch hub passes on into the position shown in Fig. 6. Thus at the end of the first quarter revolution the parts are disengaged as shown. The next full revolution from the position shown in Figs. 5 and 6 to the position shown in Figs. 7 and 8 brings the driving tooth around against the tooth on the floating sleeve. It carries them both around a short distance into the position shown in Fig. 8. The next full revolution brings the parts into the position shown in Figs. 9 and 10. The cam having now made one half revolution, the stop lever again is permitted to be forced by the spring into engagement with the sleeve.

With the parts in the position shown in Figs. 9 and 10, the stop lever resting against the floating sleeve in the path of the stop on the sleeve, the parts rotate into the position shown in Figs. 3 and 4. The stop on the sleeve engages the top of the stop lever. The sleeve can no longer rotate. The clutch continues to rotate and the driving tooth slides down the cam or inclined surface of the sleeve tooth and the parts are thrust into the position shown in Fig. 1. This brings the dog on the clutch lever into engagement with the stop on the base and causes the clutch to trip. Rotation then stops with the parts shown in the position of Fig. 1 ready for the next operation.

I claim:

1. The combination with a shaft and a pulley rotatably mounted thereon, of a clutch interposed between the shaft and pulley, the shaft being slidably mounted, a control lever projecting from the clutch, a stop in the path of the lever, means responsive to the will of the operator for moving the shaft to bring the stop out of line with the lever, and automatic means for moving the lever back into line with the stop.

2. The combination with a shaft and a pulley rotatably mounted thereon, of a clutch interposed between the shaft and pulley, the shaft being slidably mounted, a control lever projecting from the clutch, a stop in the path of the lever, means responsive to the will of the operator for moving the shaft to bring the stop out of line with the lever, and automatic means for moving the lever back into line with the stop, said means comprising a floating sleeve on the shaft, a cam member thereon, a part supporting the clutch in opposition to such cam member, and means for arresting the rotation of such floating sleeve at predetermined intervals to bring the cam member into operative engagement with the clutch supporting part to move the clutch longitudinally.

3. A transmission mechanism comprising a longitudinally movable shaft, a sleeve floating on the shaft, a cam carried by the sleeve, a stop carried by the sleeve, a driving member rotatably mounted on the shaft, a clutch interposed between the shaft and the driving member the clutch being held against longitudinal movement with respect to the shaft, a controlling lever for the clutch, a stop adapted to engage it, the shaft being adapted to move when operated by the operator longitudinally to bring the clutch lever out of line with its stop, and means responsive to rotation of the shaft for tripping the clutch.

4. A transmission mechanism comprising a longitudinally movable shaft, a sleeve floating on the shaft, a cam carried by the sleeve, a stop carried by the sleeve, a driving member rotatably mounted on the shaft, a clutch interposed between the shaft and the driving member the clutch being held against longitudinal movement with respect to the shaft, a controlling lever for the clutch, a stop adapted to engage it, the shaft being adapted to move when operated by the operator longitudinally to bring the clutch lever out of line with its stop, and means responsive to rotation of the shaft for tripping the clutch, said means comprising a star wheel driven by the clutch, a cam carried thereby, and a stop lever adapted to be thrown into and out of the path of the stop on the floating sleeve by the rotation of the star wheel.

5. A bag tying machine comprising a rotatable mandrel, a tie engaging means on the end thereof, a pulley mounted for rotation upon the mandrel, a clutch mounted upon the mandrel adapted to provide a driving means between the pulley and the mandrel, means responsive to a longitudinal movement of the mandrel for throwing the clutch into operation to effect the driving connection, and automatic means operative after predetermined revolution of the mandrel for disengaging the clutch.

6. A bag tying machine comprising a rotating mandrel, a tie engaging means on the end thereof, a pulley mounted for rotation on the mandrel and carrying a clutch element, a second clutch element mounted for rotation with the mandrel, and means located at one side of the mandrel for automatically throwing out the clutch after predetermined revolution of the mandrel.

7. A bag tying machine comprising a rotating mandrel, a tie engaging means on the end thereof, a pulley mounted for rotation on the mandrel and carrying a clutch element, a second clutch element mounted for rotation with the mandrel, and means responsive to the longitudinal motion of the mandrel for operating the clutch to provide a power transmitting means between the pulley and the mandrel to rotate it.

8. A bag tying machine comprising a rotating mandrel, a tie engaging means on the end thereof, a pulley mounted for rotation on the mandrel, a clutch between the mandrel and pulley, a stop adjacent the clutch, a lever adapted to engage said stop to disengage the clutch and yielding means for throwing the lever into the operating position, the mandrel being slidably mounted to permit movement of the clutch lever out of engagement with the stop when the operator pulls on the tie engaging means.

9. A bag tying machine comprising a rotating mandrel, a tie engaging means on the end thereof, a pulley mounted for rotation on the mandrel, a clutch between the mandrel and pulley, a stop adjacent the clutch, a lever adapted to engage said stop to disengage the clutch and yielding means for throwing the lever into the operating position, the mandrel being slidably mounted to permit movement of the clutch lever out of engagement with the stop when the operator pulls on the tie engaging means, and timing mechanism for throwing the mandrel back in the opposite direction after a predetermined number of revolutions.

10. A bag tying machine comprising a rotating mandrel, a tie engaging means on the end thereof, a pulley mounted for rotation on the mandrel, a clutch between the mandrel and pulley, a stop adjacent the clutch, a lever adapted to engage said stop to disengage the clutch and yielding means for throwing the lever into the operating position, the mandrel being slidably mounted to permit movement of the clutch lever out of engagement with the stop when the operator pulls on the tie engaging means, timing mechanism for throwing the mandrel back in the opposite direction after a predetermined number of revolutions, said timing mechanism being normally out of operation but thrown into operation when the operator moves the mandrel.

In testimony whereof, I affix my signature in the presence of two witnesses this twelfth (12th) day of February 1916.

ADELMER M. BATES.

Witnesses:
 GRACE STAUNTON,
 MINA ENOS.